April 18, 1961
G. ALFIERI
2,980,468
PNEUMATIC BRAKING EQUIPMENT WITH MULTIPLE SECTIONS
PARTICULARLY FOR VEHICLES
Filed Jan. 7, 1959
2 Sheets-Sheet 2

2,980,468
Patented Apr. 18, 1961

2,980,468

PNEUMATIC BRAKING EQUIPMENT WITH MULTIPLE SECTIONS PARTICULARLY FOR VEHICLES

Giuseppe Alfieri, Milan, Italy, assignor to Fabbrica Italiana Magneti Marelli S.p.A., Milan, Italy, a company of Italy Filed Jan. 7, 1959, Ser. No. 785,454

Claims priority, application Italy Jan. 9, 1958

3 Claims. (Cl. 303—2)

The present invention relates to pneumatic braking equipment with a plurality of sections, and particularly of the kind comprising a distributor and compressed-air tank for each section, valves for said distributors and tanks, and moreover a lever system for actuating the valves and the distributors.

The lever system may be constituted by rockers which enable the positive isolating of a section which fails without effecting the remaining sections.

The isolating of the section that has undergone a loss of pneumatic pressure is effected by means of the closure of the corresponding valve in response to a loss of pressure in the damaged section.

It is an object of the present invention to improve said pneumatic braking equipment by the addition of extremely simple means in order to obtain safe braking thereof in the case of small losses in the damaged section, which losses in conventional types of apparatus would not be detected.

The invention is characterized in that the valves are open with the apparatus at rest and closed with the equipment in operation, in that actuating members for said valves comprise an elastic element which enables a further stroke of the rockers after seating the valves. The closing of said valves taking place prior to any stage of air distribution.

Control of the rocker may be effected either by a pneumatic servocontrol or mechanically through a lever system connected directly to the pedal of the associated brake.

Figure 1:
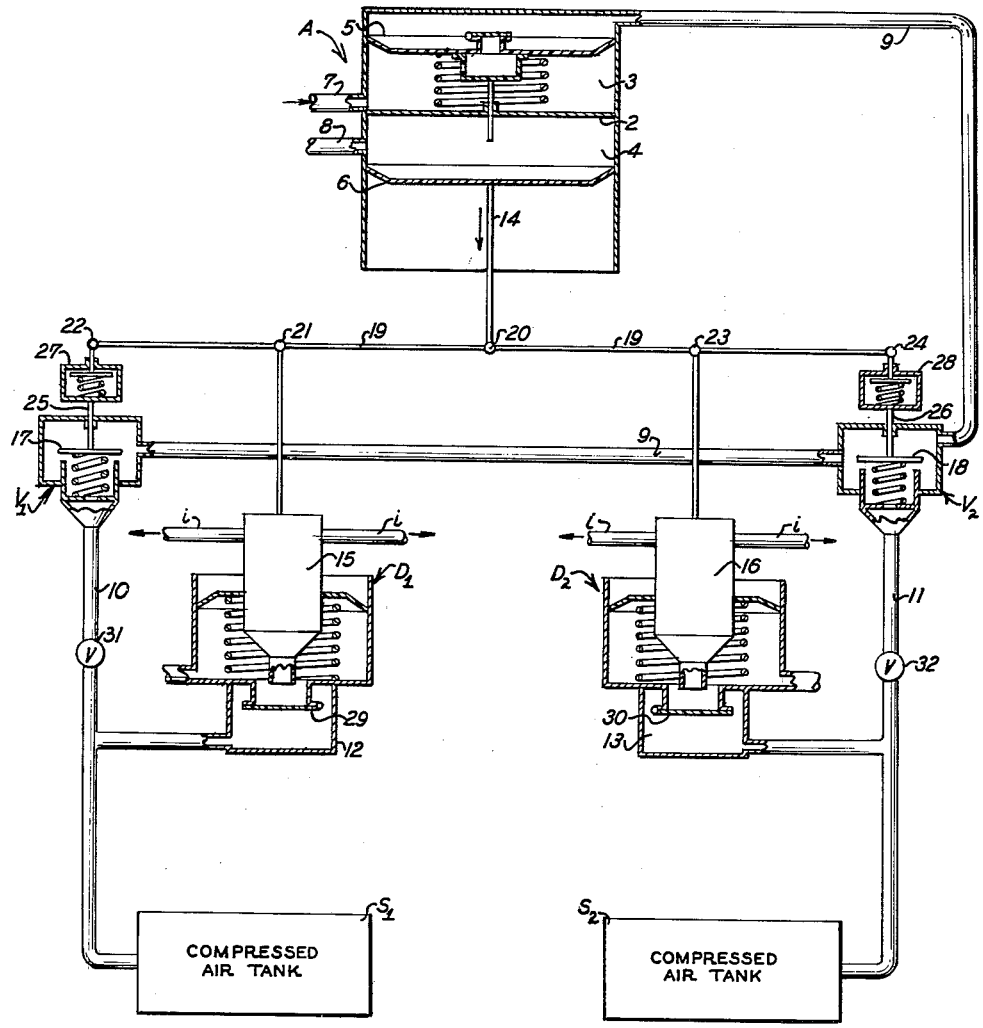
Figure 2:
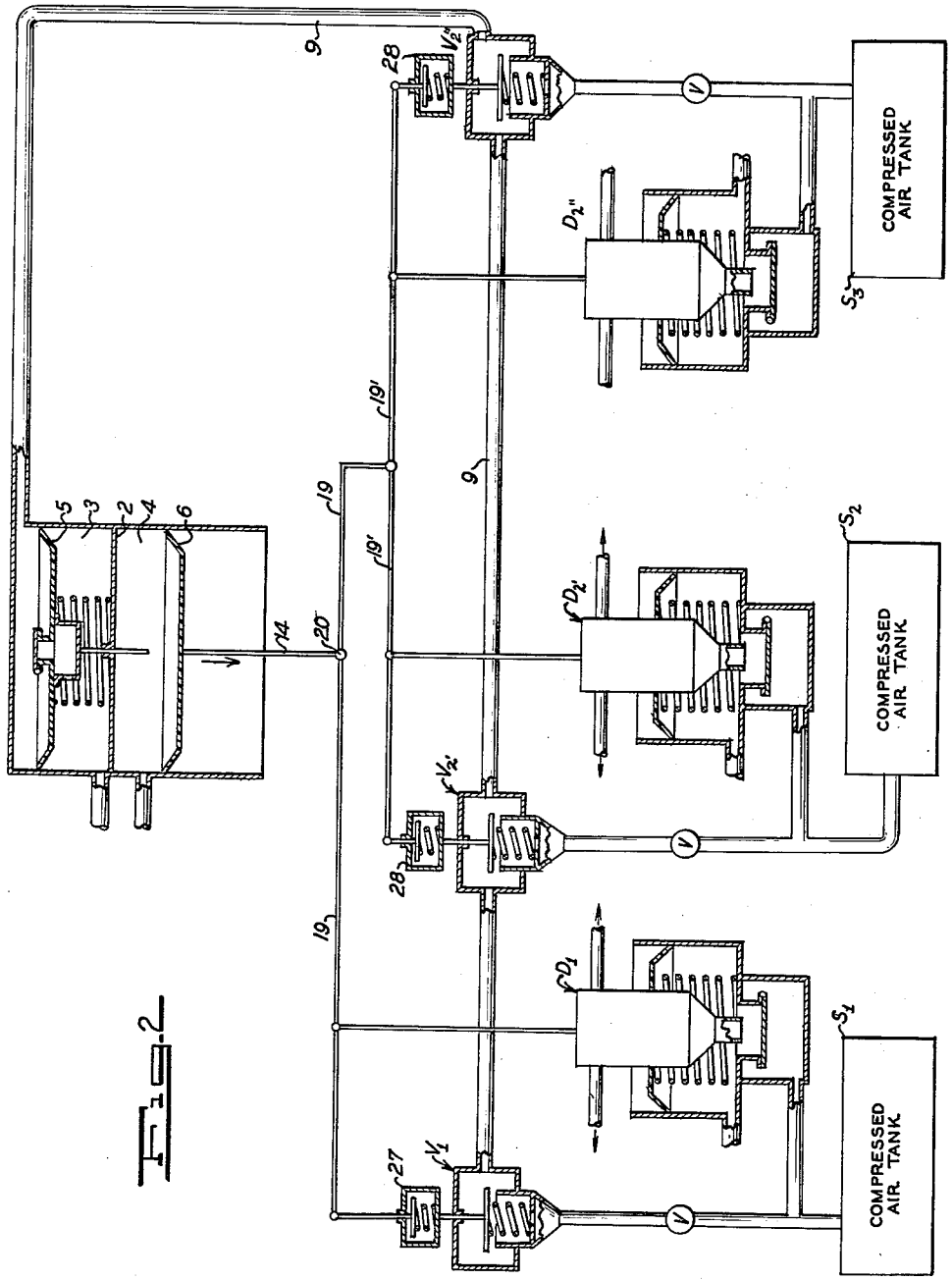

The instant equipment is more fully described hereinafter and illustrated, by way of example, in the accompanying drawings wherein:

Fig. 1 is a diagram of a braking device with two sections and two tanks, and with a pneumatic servocontrol; and Fig. 2 is a diagram of a device similar to that of Fig. 1 but with three sections and three tanks, and with a pneumatic servocontrol.

The device illustrated in Fig. 1 comprises essentially an auto-servo-distributor member A of conventional kind, two distributors $D_1$ and $D_2$ for actuating the operating members of the respective braking sections each fed by a single distributor or distributor section, two intercepting valve groups $V_1$ and $V_2$ and two compressed-air tanks $S_1$ and $S_2$ each associated with one section.

The member A is substantially constituted by a cylinder subdivided by a separating wall 2 into two chambers 3 and 4, in which there slide respectively the auto-distributor plunger 5 and the servo-auto-distributor plunger 6, the chamber 3 being connected by the conduit 7 with the automatic device of the equipment and permanently fed with air under pressure, while the chamber 4 is connected through the conduit 8 with the controllable device whence the compressed air flows thereinto during the braking stage only, to flow off as soon as the braking action ceases.

The chamber 3 is connected by means of the conduit 9 to the two valve groups $V_1$ and $V_2$, through which by means of the corresponding conduits 10 and 11 it feeds respectively the pre-chamber 12 of the distributor $D_1$ and respective tank and the pre-chamber 13 of the distributor $D_2$ and respective tank $S_2$.

The plunger 6 with the stem 14 controls mechanically the plungers 15 and 16 of the two distributors $D_1$ and $D_2$ and the mobile members 17—18 of the two valve groups $V_1$—$V_2$ through the intermediary of rocker 19 hinged at point 20 to the stem or rod 14. On one of the two arms of said rocker there are articulated respectively at 21—22 the pushers of the plunger 15 and that of the mobile member 17, while on the other arm there are articulated at 23—24, the pushers of the plunger 16 and that of the mobile member 18. Conduits $i$ indicate the exhaust port holes of the hollow plungers 15 and 16.

According to the invention, the actuating pushers 25—26 comprise respectively the elastic elements 27—28 constituted for instance by a spring, which permits a further stroke of the rocker 19 after the intercepting valves having been closed or after the members 17—18 have been placed on their seats.

Moreover the stroke of members 17—18, to place the same on their seats, is smaller than the stroke of the plungers 15—16 to lift the mobile members 29—30 of $D_1$—$D_2$, from their seats.

Said strokes are established, therefore, in such a way as to obtain opening of the inlet valves of $D_1$ and $D_2$ only when closure of the intercepting valves $V_1$—$V_2$ has occurred.

During operation, as soon as the device is activated either pneumatically by means of a servo-auto-distributor as illustrated in the drawing, or direct by the brake pedal through a member of conventional kind, the intercepting valves which in rest position were open, permitting free communication between the tanks, are seated even before the opening of the discharge valves for the multiple distributors, thereby achieving the positive cutting-off of the compressed air equipment. Subsequently the normal actuation of the distributors is effected by independent pneumatic sections and, in this stage, are not in communication.

The break-down of any section or even the loss of a small amount of air in any one of them, does not alter the efficiency of the other sections, or of the pneumatic circuit upstream of the intercepting valves. The elastic element that controls the non-return valve insures—according to a further aspect of the invention—a very limited closing pressure of said valves in such a way that if there occurs a drop of pressure upstream of the valves there is allowed an immediate reflux of air as may be required for the automatic activation of the section of the servo-auto-distributor (trailer) in case of accidental breakage of the automatic connection between the tractor and trailer in the braking stage and for feeding the pressure regulator on the distributors of the tractor. In this second case, the rocker is controlled through an adjusting spring direct by the braking pedal of the tractor and the feeding conduit 9 arrives direct from the tank of the tractor.

The cut-off valves 31—32 permit isolating the damaged section until repair has been effected.

The valve assemblies formed by the distributors D and the intercepting valves V are an integral part of the same braking system and can be the braking system of the tractor or that of the trailer. The valve actuating rocker is in one case the rocker of the control distributor of the tractor and in the other case the rocker of the servo-distributor of the trailer.

The operation of the device may also be described as follows:

Brake operative

The displacement of the rocker 19 due to the action exerted by the brake pedal linkage (braking system of the tractor) or by the piston 6 of the servo-distributor A (braking system of the trailers) causes the displacement of the valves 17, 18 and that of the distributing pistons 15, 16.

The valves 17, 18 once they have accomplished their closing stroke arrange themselves on their respective seats, whereas the pistons 15, 16 whose stroke for opening the valves (intake) 29, 30 is greater than that of the intercepting valves, continue to be displaced due to the yielding of the resilient elements 27, 28.

Brakes inoperative

The reverse movement of the rocker 19 causes the return stroke of the pistons 15, 16 which permit the valves 29, 30 to be closed, while the resilient elements 27, 28, previously compressed during the stroke of the pistons after the closure of the intercepting valves, react on said valves by keeping them closed until, due to further movement of the rocker, said resilient elements are completely relieved from strain.

Thus the complete closure of the intake valves 29, 30 with a certain advance with respect to the opening of the intercepting valves 17, 18 and thus also in this phase the braking section which is possibly out of commission (braking elements downstream of the valves 29, 30) cannot cause the discharge therethrough of the other section.

The equipment illustrated in Fig. 2 is quite similar to that of Fig. 1 and relates to an installation with three sections with three tanks $S_1$—$S_2$—$S_3$.

The installation operates like the one described above, the sole difference consisting in the rocker which is multiple instead of simple, whence the control effort coming from the plunger 6 is transmitted to the rocker 19, articulated at 20, and re-transmitted thereby, by one of the arms, to the distributor $D_1$ and valve group $V_1$ and by the other arm to a second rocker 19' which re-transmits it with its arms to the respective groups $D_{2'}$—$V_{2'}$ and $D_{2''}$—$V_{2''}$.

The invention has been illustrated with reference to particular cases, that is to the adoption of the equipment on a vehicle with two or three sections and with pneumatic and mechanical control; it would be obvious, however, to apply the device also to apparatus having $n$ number of sections.

What is claimed:

1. Pneumatic braking apparatus comprising a plurality of compressed air tanks, a distributor coupled to each tank, a supply conduit adapted for connection to said tanks and distributors, valves connecting said conduit to said tanks and distributors and including displaceable elements for opening and closing the valves, said distributors including displaceable members for the opening and closing of the same, a displaceable rocker system engaging said displaceable elements and members for operating the same, and elastic members between said system and displaceable elements to enable a displacement of said displaceable members in part independently of the displacement of said displaceable elements.

2. Apparatus as claimed in claim 1 wherein the displaceable elements have an operative stroke for closing said valves which is of lesser magnitude than the operative stroke of said displaceable members for opening said distributors.

3. Apparatus as claimed in claim 1 comprising springs engaging said displaceable elements and acting against said elastic members.

References Cited in the file of this patent

UNITED STATES PATENTS

| | | |
|---|---|---|
| 2,169,462 | Grace | Aug. 15, 1939 |
| 2,562,370 | Seale | July 31, 1951 |
| 2,745,702 | Burdick | May 15, 1956 |
| 2,871,066 | Pannier et al. | Jan. 22, 1959 |